US010274605B2

(12) United States Patent
Kazemi et al.

(10) Patent No.: US 10,274,605 B2
(45) Date of Patent: Apr. 30, 2019

(54) MULTIMODE PEDESTRIAN ODOMETER

(71) Applicant: Apple Inc., Cupertino, CA (US)

(72) Inventors: Pejman Lotfali Kazemi, Sunnyvale, CA (US); Glenn Donald MacGougan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 412 days.

(21) Appl. No.: 14/838,127

(22) Filed: Aug. 27, 2015

(65) Prior Publication Data

US 2016/0349376 A1 Dec. 1, 2016

Related U.S. Application Data

(60) Provisional application No. 62/169,540, filed on Jun. 1, 2015.

(51) Int. Cl.
*G01S 19/00* (2010.01)
*G01S 19/34* (2010.01)
*G01S 19/52* (2010.01)
*G01C 21/16* (2006.01)

(52) U.S. Cl.
CPC ............ *G01S 19/34* (2013.01); *G01C 21/165* (2013.01); *G01S 19/52* (2013.01)

(58) Field of Classification Search
CPC .......... G01S 19/34; G01S 19/52; G01S 13/52; G01S 13/723; G01S 19/29; G01C 21/165; G01C 21/28; G01C 21/16
See application file for complete search history.

(56) References Cited

U.S. PATENT DOCUMENTS

| | | | | |
|---|---|---|---|---|
| 5,416,712 A * | 5/1995 | Geier et al. | ............ | G01S 19/52 |
| 5,506,817 A * | 4/1996 | O'Brien, Jr. | ............ | G01S 13/52 |
| 5,511,042 A * | 4/1996 | O'Brien, Jr. | .......... | G01S 13/723 |
| 5,525,998 A * | 6/1996 | Geier | ..................... | G01C 21/28 |
| 5,590,043 A * | 12/1996 | McBurney | .............. | G01S 19/29 |
| 5,606,506 A * | 2/1997 | Kyrtsos | ................ | G01C 21/165 |
| 5,828,987 A * | 10/1998 | Tano et al. | .......... | G01C 21/165 |
| 6,009,375 A * | 12/1999 | Sakumoto et al. | ..... | G01S 19/52 |
| 6,081,230 A * | 6/2000 | Hoshino et al. | ..... | G01C 21/165 |
| 6,408,245 B1 * | 6/2002 | An et al. | .............. | G01C 21/165 |
| 6,459,990 B1 * | 10/2002 | McCall et al. | ....... | G01C 21/165 |
| 6,522,266 B1 * | 2/2003 | Soehren et al. | ....... | G01C 21/16 |

(Continued)

OTHER PUBLICATIONS

Wieser, "Development of a GNSS odometer," 20th ITM meeting of ION GNSS, 2007, pp. 1466-1476.

*Primary Examiner* — Bernarr E Gregory
(74) *Attorney, Agent, or Firm* — Fish & Richardson P.C.

(57) ABSTRACT

Systems, methods and non-transitory, computer-readable storage mediums are disclosed for a multimode GNSS odometer. In some implementations, a method comprises: obtaining, by a device, position and velocity data from a sensor embedded in, or coupled to the device; statistically combining, by the device, the position and velocity data to generate a first delta distance travelled by the device over a period of time, the statistical combining including weighting a contribution of an integrated speed to the first delta distance, the integrated speed derived from the obtained velocity data and period of time; filtering, by the device, the first delta distance to generate a filtered first delta distance; and generating, by the device, a first estimate of total distance travelled by the device based on the filtered first delta distance.

18 Claims, 4 Drawing Sheets

(56) References Cited

U.S. PATENT DOCUMENTS

| | | | |
|---|---|---|---|
| 2009/0315767 A1* | 12/2009 | Scalisi | G01S 19/34 342/357.74 |
| 2010/0088023 A1* | 4/2010 | Werner | G01S 19/19 701/467 |
| 2013/0197857 A1* | 8/2013 | Lu | G01S 19/19 702/141 |

* cited by examiner

MULTIMODE PEDESTRIAN ODOMETER

CROSS-REFERENCE TO RELATED APPLICATION

This application claims priority to U.S. Provisional Patent Application No. 62/169,540, entitled "Multimode Pedestrian Odometer," filed Jun. 1, 2015, the entire contents of which are incorporated herein by reference.

TECHNICAL FIELD

This disclosure relates generally to computing distance traveled by a pedestrian based on location data.

BACKGROUND

Mobile devices are often used with fitness applications for monitoring and tracking fitness-related metrics such as distance traveled, calorie consumption and heartbeat. Some mobile devices use data provided by a Global Navigation Satellite System (GNSS) receiver that is embedded in or coupled to the mobile device to determine the distance traveled by a pedestrian. Traditional approaches compute the distance travelled from consecutive position solutions or Doppler-based velocity estimates output by the GNSS receiver. In both approaches the errors can grow significantly over time, resulting in a biased estimate of the distance traveled. This is especially true when the GNSS estimated position and velocity have large errors by operating in a multipath environment (e.g., urban canyons) or when the GNSS position update rate is slow allowing position errors to grow rapidly.

SUMMARY

Systems, methods and non-transitory, computer-readable storage mediums are disclosed for a multimode pedestrian odometer.

In some implementations, a method comprises: obtaining, by a device, position and velocity data from a sensor embedded in, or coupled to the device; statistically combining, by the device, the position and velocity data to generate a first delta distance travelled by the device over a period of time, the statistical combining including weighting a contribution of an integrated speed to the first delta distance, the integrated speed derived from the obtained velocity data and period of time; filtering, by the device, the first delta distance to generate a filtered first delta distance; and generating, by the device, a first estimate of total distance travelled by the device based on the filtered first delta distance.

In some implementations, a device comprises: a sensor; one or more processors; and one or more computer-readable mediums coupled to the one or more processors and configured to store instructions, which, when executed by the one or more processors, causes the one or more processors to perform operations comprising: obtaining position and velocity data from the sensor; statistically combining the position and velocity data to generate a first delta distance travelled by the device over a period of time, the statistical combining including weighting a contribution of an integrated speed to the first delta distance, the integrated speed derived from the obtained velocity data and period of time; filtering the first delta distance to generate a filtered first delta distance; and generating a first estimate of total distance travelled by the device based on the filtered first delta distance.

Particular implementations disclosed herein provide one or more of the following advantages. A multimode pedestrian odometer is configured to estimate the distance travelled by a pedestrian by adapting to different types of inputs and switching to different modes to keep errors low.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Example System

Figure 1:
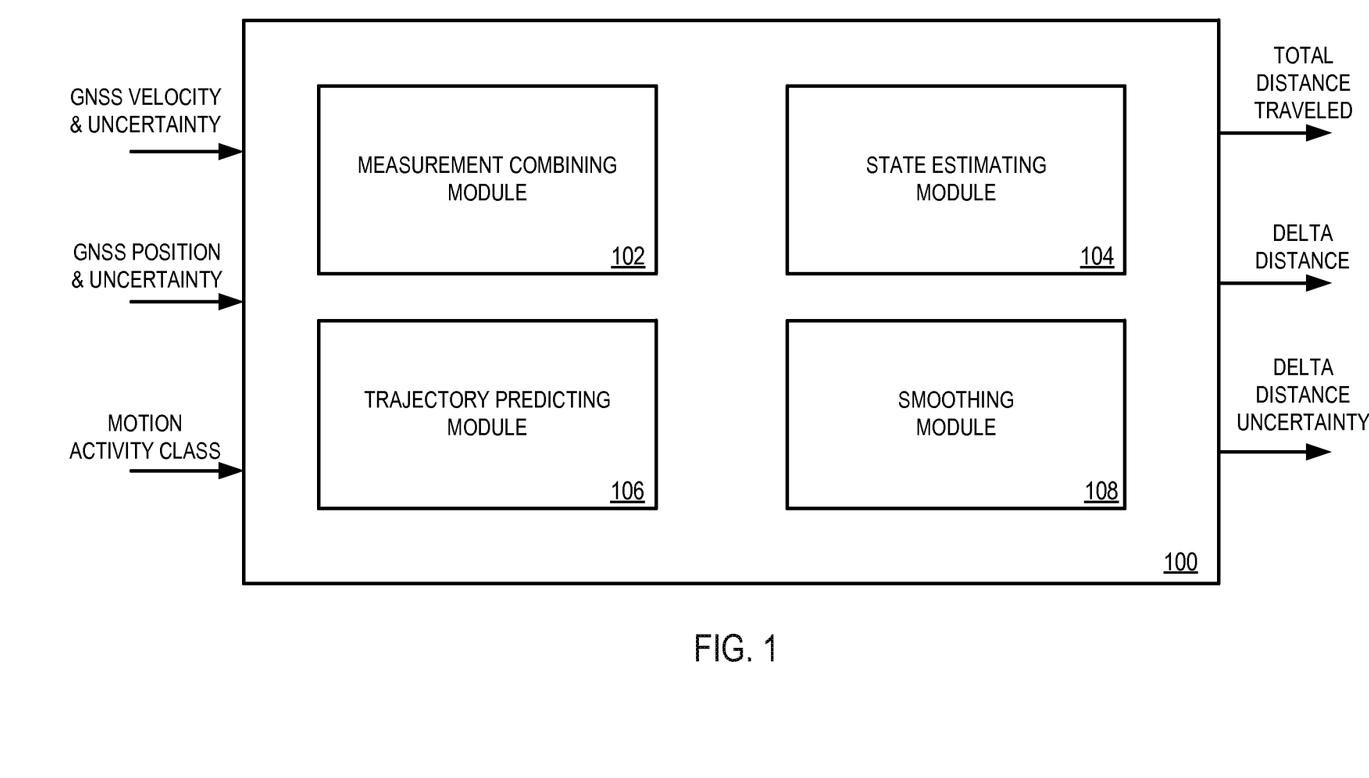
FIG. 1 is a block diagram illustrating subsystems of an example multimode pedestrian odometer system.

FIG. 1 is a block diagram illustrating subsystems of an example multimode pedestrian odometer system 100. System 100 can be implemented on a mobile device, including but not limited to smart phones, tablet computers, wearable computers (e.g., smart watch) and the like. In some implementations, system 100 can include measurement combining module 102, state estimating module 104, trajectory predicting module 106 and smoothing module 108. System 100 outputs an estimated total distance travelled by a pedestrian who is wearing or holding the mobile device. System 100 is configured to adapt to different types of inputs and switch to different modes to keep errors low as described below.

System 100 receives location data from, for example, a GNSS receiver. Examples of GNSS receivers include Global Position System (GPS), Russian GLONASS, BeiDou (Compass) and Galileo. The GNSS data includes position and velocity estimates and corresponding position and velocity uncertainty values. Location data can also be provided by other sources including but not limited to WiFi and cell positioning systems. The description that follows assumes that the location data is provided by a GNSS receiver chip.

In some implementations, GNSS data updates are provided to system 100 at different rates depending on the processing mode. For example, in a normal processing mode (NPM) the GNSS data can be updated at 1 Hz (once per second). In a low power processing mode (LPPM), the GNSS data can be updated at 0.1 Hz (once per 10 seconds) to conserve power on the mobile device by doing less frequent GNSS data updates. In some implementations, system 100 can operate in a LPPM batch mode (LPPM-B), where a block of GNSS data collected over time is received and processed by system 100. As described below, batch mode allows use of past, present and future GNSS data to compute the total distance travelled of a pedestrian.

In some cases, the GNSS data updates may be delayed for a period of time due to, for example, GNSS satellite outage. In such cases, system 100 determines whether the delayed updates are due to a GNSS satellite outage or a deliberate mode change based on the amount of time between GNSS updates. For example, if there is a consistent pattern of delay (e.g., updates every 10 seconds) then it is likely a deliberate mode change. If there is random pattern of delay (e.g., a 20 second delay followed by a 8 second delay, etc.), it is likely that a GNSS satellite outage has occurred. Once a deliberate mode change is detected, system 100 selects the appropriate processing chain to estimate total distance travelled as described in reference to FIG. 2 below.

In some implementations, system 100 when implemented on a mobile device can supply client applications running on the mobile device with total distance traveled and other data through, for example, an Application Programming Interface (API). In some implementations, other data can include delta distance (distance between two consecutive position measurements) and a value representing the uncertainty or error in the delta distance. Through the API, client applications can request and receive GNSS data having different accuracy levels. For example, if the system 100 is operating in LPPM-B or LPPM mode, a client application can request and receive less accurate GNSS position and/or velocity data due to the position and velocity errors built up between updates of GNSS. The less frequent the GNSS data updates the more uncertain the estimated total distance travelled will be.

Figure 2:
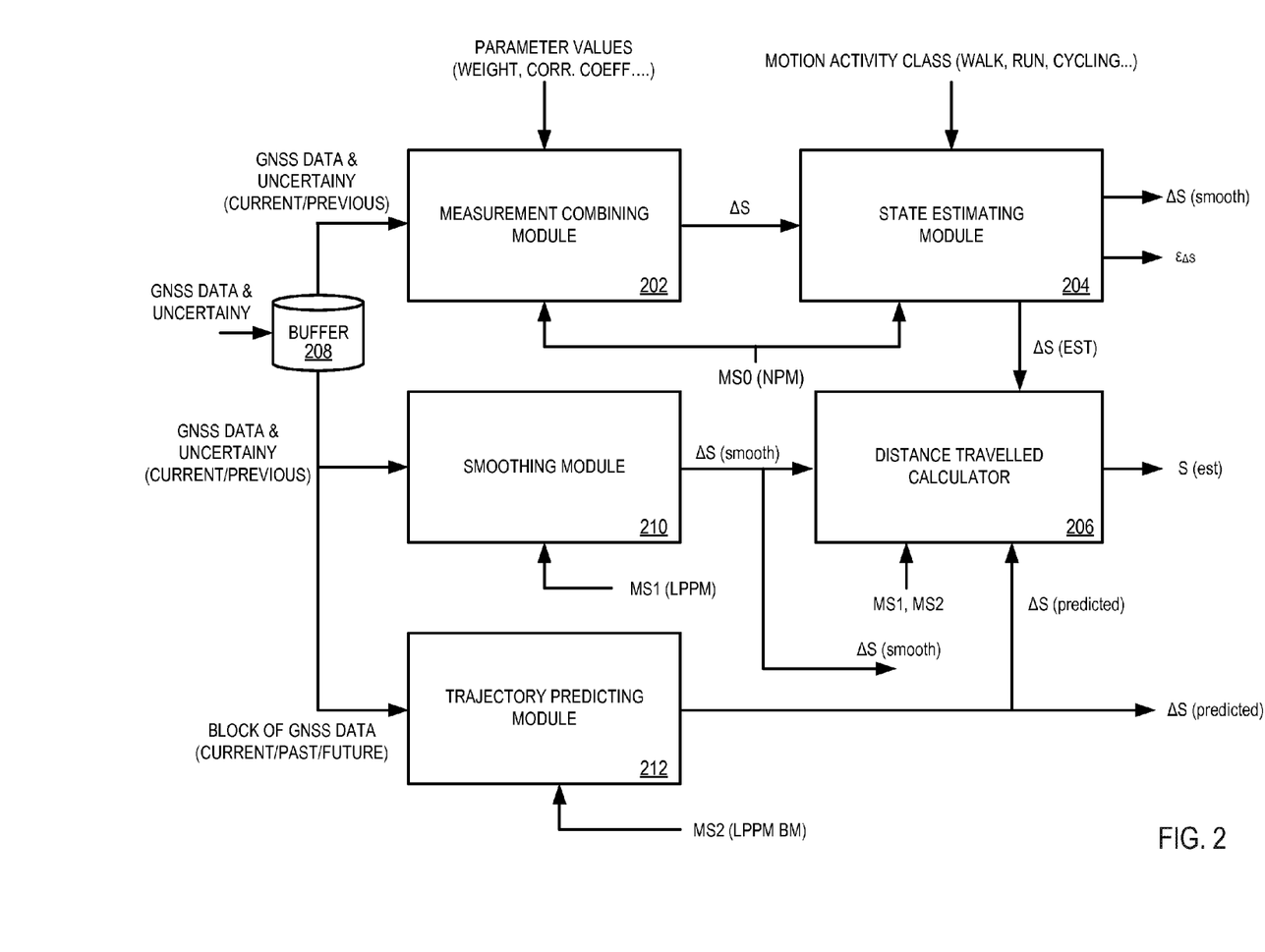
FIG. 2 is a block diagram illustrating interoperability of the subsystems shown in FIG. 1.

FIG. 2 is a block diagram illustrating interoperability of the subsystems shown in FIG. 1. In some implementations, when in NPM (e.g., 1 Hz updates), measurement combining module 202 receives GNSS data (e.g., position and velocity data) and corresponding uncertainty values (position and velocity uncertainty values) and calculates a delta distance $\Delta S$ (the distance between two consecutive distance measurements). Module 202 can become activated whenever new GNSS data becomes available and an NPM mode signal is received by module 202. In some implementations, when module 202 is activated, module 202 calculates a delta position (the difference between current and previous raw GNSS positions), integrates raw GNSS speed and then combines these two values in a weighted least squares (WLS) formulation.

In some implementations, the WLS formulation is described by Equation [1] in vector/matrix notation:

$$\Delta x = (A^T W^T W A)^{-1} A^T W^T W \Delta z, \qquad [1]$$

$$x_{k|k-1} = x_{k-1|k-1} + \Delta x, \qquad [2]$$

where $\Delta x$ is a vector of corrections to state vector $x_{k-1|k-1}$, A is a matrix of partial derivatives of observations with respect to the state elements, $\Delta z$ is a vector of measurement residuals, W is a weight vector that includes the inverse of the standard deviations of each of the measurements being considered and $x_{k|k-1}$ is the corrected state vector.

Implementing Equations [1] and [2] for delta distance $\Delta s_k$ and estimated total distance travelled s gives:

$$\Delta s_{k|k} = v_{k|k} \Delta t + \frac{p_{k|k}}{p_{k|k} + r_k} (\Delta x_{k|k} - v_{k|k} \Delta t), \qquad [3]$$

$$s_{k|k-1} = s_{k-1|k-1} + \Delta s_{k|k}, \qquad [4]$$

where $s_{k|k-1}$ is the total distance traveled at the current GNSS measurement epoch, $s_{k-1|k-1}$ is the total distance traveled at the previous GNSS measurement epoch, $\Delta s_{k|k-1}$ is the delta distance, $v_{k-1|k-1}$ is GNSS speed (the norm or magnitude of the GNSS velocity vector) at the previous GNSS measurement epoch, $\Delta x_{k|k-1}$ is a GNSS position difference (difference between GNSS positions at the current and previous measurement epoch), $p_{k-1|k-1}$ is the error covariance for $\Delta s$ at the previous GNSS measurement epoch, $r_k$ is measurement noise and $\Delta t$ is the time step between the current and previous GNSS measurement epochs.

In some implementations, the error covariance $p_o$ is given by:

$$p_{k-1} = \frac{(\sigma_{v_{k-1}}^2 + \sigma_{v_k}^2) \Delta t^2}{2}, \qquad [5]$$

where $\sigma_{v_{k-1}}$ is the GNSS velocity uncertainty at the previous GNSS measurement epoch and $\sigma_{v_k}$ is the GNSS velocity uncertainty at the current GNSS measurement epoch. The GNSS velocity uncertainties ($\sigma_{v_{k-1}}, \sigma_{v_k}$) can be provided by, for example, a GNSS receiver chip embedded in, or coupled to a mobile device worn or carried by the pedestrian.

In some implementations, the measurement noise r can be given by:

$$r = (\sigma_{H_{k-1}}^2 + \sigma_{H_k}^2) - 2\rho \sigma_{H_{k-1}} \sigma_{H_k}, \qquad [6]$$

where $\sigma_{H_{k-1}}$ is the horizontal GNSS position uncertainty at the previous GNSS measurement epoch, $\sigma_{H_k}$ is the horizontal GNSS position uncertainty at the current GNSS measurement epoch and $\rho$ is a correlation coefficient correlating GNSS position measurement uncertainty with GNSS velocity measurement uncertainty. The correlation coefficient $\rho$ can be chosen (e.g., selected from the range 0.0-1.0) to de-weight the GNSS velocity in the calculation of $\Delta s$ and thus place more emphasis on the GNSS position difference rather than the integrated speed ($v\Delta t$) in the calculation of delta distance. There can be a different correlation coefficient for each anticipated GNSS data measurement update rate (e.g., 1 Hz, 0.1 Hz). A smaller correlation coefficient can be used for slower update rates (e.g., 0.1 Hz update rate). The GNSS horizontal position uncertainties ($\sigma_{H_{k-1}}, \sigma_{H_k}$) can be provided by, for example, a GNSS receiver chip embedded in, or coupled to the mobile device.

In some implementations, state estimating module 204 receives delta distance $\Delta s$ from module 204 and calculates a smooth delta distance $\widehat{\Delta s}$ using, for example, a Kalman filter formulation as described by equations [7]-[11] below.

State Prediction

The predicted (a prior) state estimate is given by:

$$\widehat{\Delta s}_{k|k-1} = \widehat{\Delta s}_{k-1|k-1}, \qquad [7]$$

where $\widehat{\Delta s}_{k|k-1}$ is an estimate of the delta distance.

Covariance Prediction

The predicted (a prior) error covariance estimate is given by:

$$p_{k|k-1} = p_{k-1|k-1} + q_k \frac{\Delta t^2}{2}, \qquad [8]$$

where $q_k$ is process noise, $\Delta t$ is a time step and $p_{k|k-1}$ can be initialized with a large integer value that is determined empirically.

Kalman Gain

The equation for Kalman gain is given by $$k_k = \frac{p_{k|k-1}}{p_{k|k-1} + r_k} \qquad [9]$$

where the measurement noise $r_k$ can be determined empirically.

State Update

The updated (a posterior) state is given by $$\widehat{\Delta s}_{k|k} = \widehat{\Delta s}_{k|k-1} + k_k^*(\Delta s_k - \widehat{\Delta s}_{k|k-1}), \quad [10]$$

where $\Delta s_{k|}$ is the raw delta distance provided by module 202.

Covariance Update

The updated (a posterior) error covariance is given by $$p_{k|k} = (1-k_k)p_{k|k-1}. \quad [11]$$

The value of the process noise q in equation [8] above can be initially set to a default value. In response to a change in motion activity class, the process noise q can be adapted (e.g., adjusted or replaced) with a different value. For example, the process noise q can be adapted (e.g., adjusted or replaced) with a different value to allow state estimating module 204 (e.g., a Kalman filter) to catch up with the new motion activity class. For example, the process noise q can be larger for stationary or walking motion activity classes and smaller for cycling or running motion activity classes.

In some implementations, state estimating module 204 can be adapted if the time step Δt exceeds a maximum value. For example, if the raw distance travelled input to state estimating module 204 has not changed for a maximum threshold time (e.g., 20 seconds) or a new raw distance travelled has not been received for a maximum threshold delay time (e.g., 8 seconds), state estimating module 204 can be reset by, for example, reinitializing the state and covariance elements. In some implementations, the raw distance travelled can be validated before being processed by state estimating module 204. If the raw distance travelled is invalid (e.g., diverging over several measurement cycles) it can be discarded so that it is not processed by state estimating module 204.

The output of state estimating module 204 is estimated (smoothed) delta distance $\widehat{\Delta s}_{k|k}$ and an estimate of delta distance accuracy $\varepsilon_{\Delta s}$. In some implementation, $\varepsilon_{\Delta s}$ is given by equation [12]:

$$\varepsilon_{\Delta s} = \sqrt{p_{k-1|k-1} - \frac{p_{k-1|k-1}^2}{p_{k-1|k-1} + r_k}}. \quad [12]$$

The smoothed delta distance $\widehat{\Delta s}_{k|k}$ is provided as input to distance travelled calculator 206, where equation [4] is applied to get an estimate of the total distance travelled ($\hat{s}_{k|k}$).

In some implementations, when operating in LLPM (e.g., 0.1 Hz GNSS updates), multiple samples of GNSS data can be stored in buffer 208 and provided to smoothing module 210. Smoothing module 210 can be implemented as an nth order linear low pass digital filter, Kalman filter, moving average filter, moving median filter or any other known smoothing filter or technique. In some implementations, module 210 computes a position difference from current and past GNSS position data to create a delta distance and then applies a Kalman filter to the delta distance, as described in reference to equations [7]-[11]. Smoothing module 210 can provide a more accurate total distance travelled when operating in LPPM (at lower GNSS data update rate) than can be achieved by the cascade of module 202 and 204.

In some implementations, when operating in LLPM-B, a block of GNSS data can be stored in buffer 208 and provided to trajectory predicting module 212. In some implementations, module 212 can implement a polynomial curve fitting (e.g., least squares, batch gradient descent, Lagrange interpolation polynomial) on the block of GNSS data (e.g., GNSS position data). In some implementations, module 212 implements a least squares polynomial fitting by generating coefficients for polynomial p(x) of degree n that is a best fit (in a least-squares sense) for the block of GNSS position data. The coefficients in p(x) are in descending powers and the length of p(x) is n+1, where p(x) is given by:

$$p(x) = p_1 x^n + p_2 x^{n-1} + p_3 x^{n-2} + \ldots p_n x + p_{n+1}. \quad [13]$$

From p(x) a GNSS position trajectory can be constructed from which the delta distance over a time period can be predicted and provided to distance travelled calculator 206.

Example Process

Figure 3:
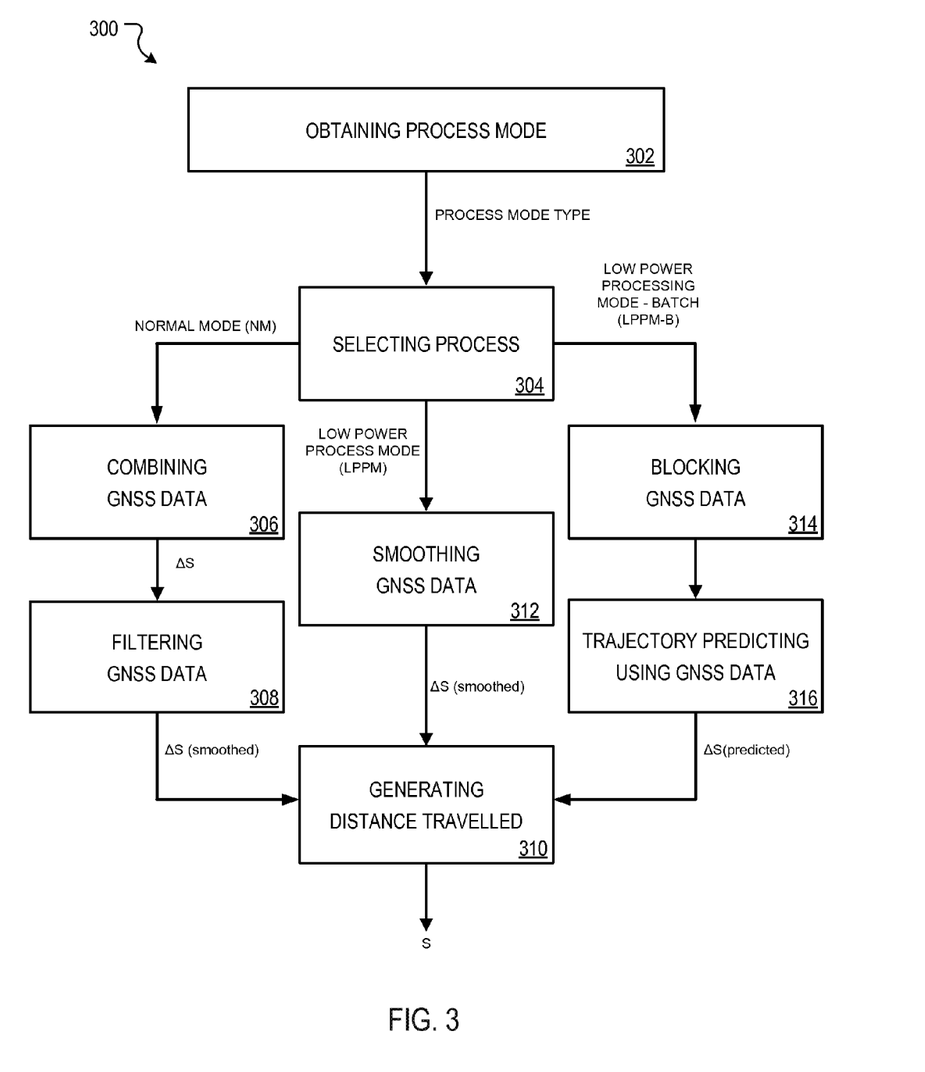
FIG. 3 is a flow diagram of an example process performed by a multimode GNSS odometer.

FIG. 3 is a flow diagram of an example process 300 performed by a multimode pedestrian odometer. Process 300 can be implemented by mobile device architecture 400, as described in reference to FIG. 4.

In some implementations, process 300 can begin by obtaining a process mode (302). For example, the time difference between GNSS updates can be monitored to see if the update rate (delay between updates) has changed, which could occur if the process mode has changed to, for example, LPPM or LPPM-B. In some implementations, the delay can be due to GNSS satellite outage, in which case, process 300 can determine the reason for delay by looking for consistency or randomness in the amount of delay between updates.

Process 300 can continue by selecting a process based on the obtained process mode (304). For example, the process mode can be one of NPM, LPPM and LPPM-B or any other suitable process mode (e.g., a process mode for medium power mode).

Process 300 can continue by activating the appropriate process for calculating an estimated total distance traveled. If NPM is selected, GNSS data is combined (306) using, for example, a WLS formulation to provide a delta distance. The delta distance is then filtered (308) to provide an estimated or smoothed delta distance. An estimated total distance travelled is then generated (310) using the smoothed delta distance.

If LPPM is selected, a delta distance is calculated from GNSS position data and smoothed (312) using a low pass filter, Kalman filter or the like. An estimated total distance travelled is then generated (310) using the smoothed delta distance.

If LPPM-B is selected, a block of GNSS data is used to construct a trajectory (316) using, for example, polynomial curve fitting (e.g., least squares fitting) on past, present and future GNSS position data. An estimated total distance travelled is then generated/predicted (310) using the trajectory.

Example Device Architecture

Figure 4:
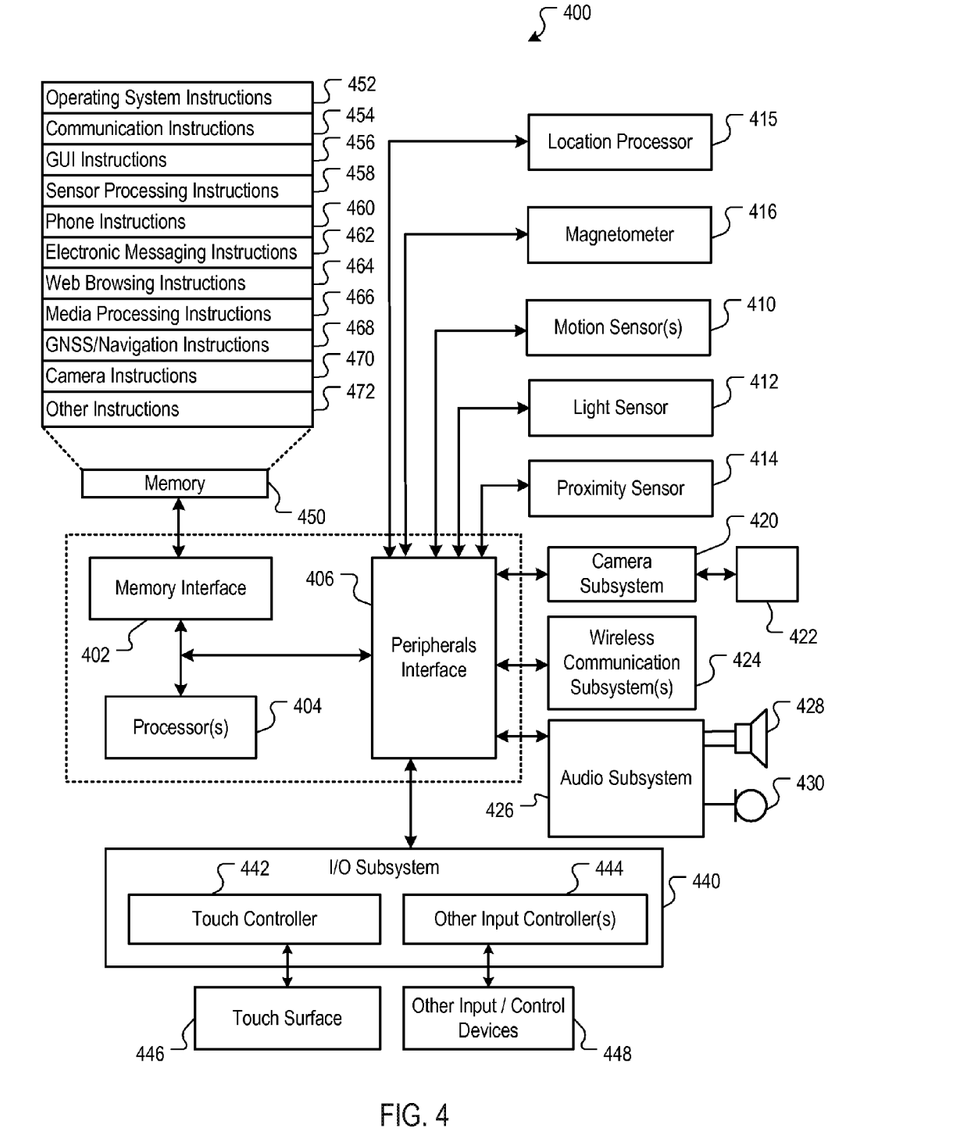
FIG. 4 is a block diagram of example device architecture for implementing the features and processes described in reference to FIGS. 1-3.

FIG. 4 is a block diagram of example device architecture 400 for implementing the features and processes described in reference to FIGS. 1-3. Architecture 400 may be implemented in any mobile device for generating the features and processes described in reference to FIGS. 1-3, including but not limited to portable computers, smart phones, tablet computers, game consoles, wearable computers and the like. Architecture 400 may include memory interface 402, data processor(s), image processor(s) or central processing unit(s) 404, and peripherals interface 406. Memory interface 402, processor(s) 404 or peripherals interface 406 may be separate components or may be integrated in one or more integrated circuits. One or more communication buses or signal lines may couple the various components.

Sensors, devices, and subsystems may be coupled to peripherals interface 406 to facilitate multiple functionalities. For example, motion sensor 410, light sensor 412, and proximity sensor 414 may be coupled to peripherals interface 406 to facilitate orientation, lighting, and proximity functions of the device. For example, in some implementations, light sensor 412 may be utilized to facilitate adjusting the brightness of touch surface 446. In some implementations, motion sensor 410 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 406, such as a temperature sensor, a biometric sensor, or other sensing device, to facilitate related functionalities.

Location processor 415 (e.g., GNSS receiver chip) may be connected to peripherals interface 406 to provide georeferencing. Electronic magnetometer 416 (e.g., an integrated circuit chip) may also be connected to peripherals interface 406 to provide data that may be used to determine the direction of magnetic North. Thus, electronic magnetometer 416 may be used as an electronic compass.

Camera subsystem 420 and an optical sensor 422, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 424. Communication subsystem(s) 424 may include one or more wireless communication subsystems. Wireless communication subsystems 424 may include radio frequency receivers and transmitters and/or optical (e g, infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 424 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 424 may include hosting protocols such that the device may be configured as a base station for other wireless devices. As another example, the communication subsystems may allow the device to synchronize with a host device using one or more protocols or communication technologies, such as, for example, the TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 426 may be coupled to a speaker 428 and one or more microphones 430 to facilitate voice-enabled functions, such as voice recognition, voice replication, digital recording, and telephony functions.

I/O subsystem 440 may include touch controller 442 and/or other input controller(s) 444. Touch controller 442 may be coupled to a touch surface 446. Touch surface 446 and touch controller 442 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 446. In one implementation, touch surface 446 may display virtual or soft buttons and a virtual keyboard, which may be used as an input/output device by the user.

Other input controller(s) 444 may be coupled to other input/control devices 448, such as one or more buttons, rocker switches, thumb-wheel, infrared port, USB port, and/or a pointer device such as a stylus. The one or more buttons (not shown) may include an up/down button for volume control of speaker 428 and/or microphone 430.

In some implementations, architecture 400 may present recorded audio and/or video files, such as MP3, AAC, and MPEG video files. In some implementations, architecture 400 may include the functionality of an MP3 player and may include a pin connector for tethering to other devices. Other input/output and control devices may be used.

Memory interface 402 may be coupled to memory 450. Memory 450 may include high-speed random access memory or non-volatile memory, such as one or more magnetic disk storage devices, one or more optical storage devices, or flash memory (e.g., NAND, NOR). Memory 450 may store operating system 452, such as Darwin™, RTXC, LINUX™, UNIX™, OS X™, WINDOWS™, or an embedded operating system such as VxWorks™. Operating system 452 may include instructions for handling basic system services and for performing hardware dependent tasks. In some implementations, operating system 452 may include a kernel (e.g., UNIX™ kernel).

Memory 450 may also store communication instructions 454 to facilitate communicating with one or more additional devices, one or more computers or servers, including peer-to-peer communications. Communication instructions 454 may also be used to select an operational mode or communication medium for use by the device, based on a geographic location (obtained by the GPS/Navigation instructions 468) of the device.

Memory 450 may include graphical user interface instructions 456 to facilitate graphic user interface processing, including a touch model for interpreting touch inputs and gestures; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes; camera instructions 470 to facilitate camera-related processes and functions; and other instructions 472 for performing some or all of the features and processes, as described in reference to FIGS. 1-3.

Each of the above identified instructions and applications may correspond to a set of instructions for performing one or more functions described above. These instructions need not be implemented as separate software programs, procedures, or modules. Memory 450 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    obtaining, by a location processor of a mobile device, position and velocity data from a global navigation satellite system (GNSS) receiver embedded in, or coupled to the mobile device;
    statistically combining, by the location processor, the position and velocity data to generate a first delta distance travelled by the mobile device over a period of time, the statistical combining including configuring the location processor to adjust a weighting of a contribution of an integrated speed to the first delta distance, the integrated speed derived from the obtained GNSS velocity data and period of time;
    filtering, by the location processor, the first delta distance to generate a filtered first delta distance; and
    generating, by the location processor, a first estimate of total distance travelled by the mobile device based on the filtered first delta distance.

2. The method of claim 1, further comprising:
    detecting, by the location processor, a process mode change;
    responsive to the process mode change:
        generating, by the location processor, a trajectory of the mobile device over the time period using a block of the obtained position data;
        determining, by the location processor, a second delta distance travelled by the mobile device based on the trajectory; and
        generating, by the location processor, a second estimate of total distance travelled by the mobile device based on the second delta distance.

3. The method of claim 2, wherein generating the trajectory of the mobile device over the time period using the block of the obtained position data includes applying a polynomial fitting to the block of obtained position data.

4. The method of claim 1, further comprising:
    detecting, by the location processor, a process mode change;
    responsive to the process mode change:
        determining, by the location processor, a second delta distance travelled by the mobile device;
        filtering, by the location processor, the second delta distance to generate a filtered second delta distance; and
        generating, by the location processor, a second estimate of total distance travelled by the mobile device based on the filtered second delta distance.

5. The method of claim 4, wherein filtering the second delta distance to generate the filtered second delta distance includes applying a Kalman filter to the second delta distance.

6. The method of claim 1, wherein statistically combining the position and velocity data to generate the first delta distance travelled by the mobile device over the period of time includes applying a Weighted Least Squares (WLS) formulation to the position data integrated speed.

7. The method of claim 1, wherein filtering the first delta distance to generate the filtered first delta distance includes applying a Kalman filter to the first delta distance.

8. The method of claim 1, wherein an amount of weighting of the contribution of the integrated speed to the first delta distance is based on an update rate of the position and velocity data from the GNSS receiver.

9. The method of claim 1, further comprising:
    receiving, by the location processor, an update of the position and velocity from the GNSS receiver;
    determining, by the location processor, that the update is delayed due to a process change; and
    terminating, by the location processor, the method.

10. A mobile device comprising:
    a global navigation satellite system (GNSS) receiver;
    a location processor;
    one or more computer-readable mediums coupled to the location processor and configured to store instructions that when executed by the location processor, cause the location processor to perform operations comprising:
        obtaining position and velocity data from a global navigation satellite system (GNSS) receiver embedded in, or coupled to the mobile device;
        statistically combining the position and velocity data to generate a first delta distance travelled by the mobile device over a period of time, the statistical combining including configuring the location processor to adjust a weighting of a contribution of an integrated speed to the first delta distance, the integrated speed derived from the obtained GNSS velocity data and period of time;
        filtering the first delta distance to generate a filtered first delta distance; and
        generating a first estimate of total distance travelled by the mobile device based on the filtered first delta distance.

11. The mobile device of claim 10, further comprising:
    detecting a process mode change;
    responsive to the process mode change:
        generating a trajectory of the mobile device over the time period using a block of the obtained position data;
        determining a second delta distance travelled by the mobile device based on the trajectory; and generating a second estimate of total distance travelled by the mobile device based on the second delta distance.

12. The mobile device of claim 11, wherein generating the trajectory of the mobile device over the time period using the block of the obtained position data includes applying a polynomial fitting to the block of obtained position data.

13. The mobile device of claim 10, further comprising:
   detecting a process mode change;
   responsive to the process mode change:
      determining a second delta distance travelled by the mobile device;
      filtering the second delta distance to generate a filtered second delta distance; and
      generating a second estimate of total distance travelled by the mobile device based on the filtered second delta distance.

14. The mobile device of claim 13, wherein filtering the second delta distance to generate the filtered second delta distance includes applying a Kalman filter to the second delta distance.

15. The mobile device of claim 10, wherein statistically combining the position and velocity data to generate the first delta distance travelled by the mobile device over the period of time includes applying a Weighted Least Squares (WLS) formulation to the position data and the integrated speed.

16. The mobile device of claim 10, wherein filtering the first delta distance to generate the filtered first delta distance includes applying a Kalman filter to the first delta distance.

17. The mobile device of claim 10, wherein an amount of weighting of the contribution of the integrated speed to the first delta distance is based on an update rate of the position and velocity data from the sensor.

18. The mobile device of claim 10, further comprising:
   receiving an update of the position and velocity from the GNSS receiver;
   determining that the update is delayed due to a process change; and
   terminating one or more operations.

* * * * *